Figure 1:
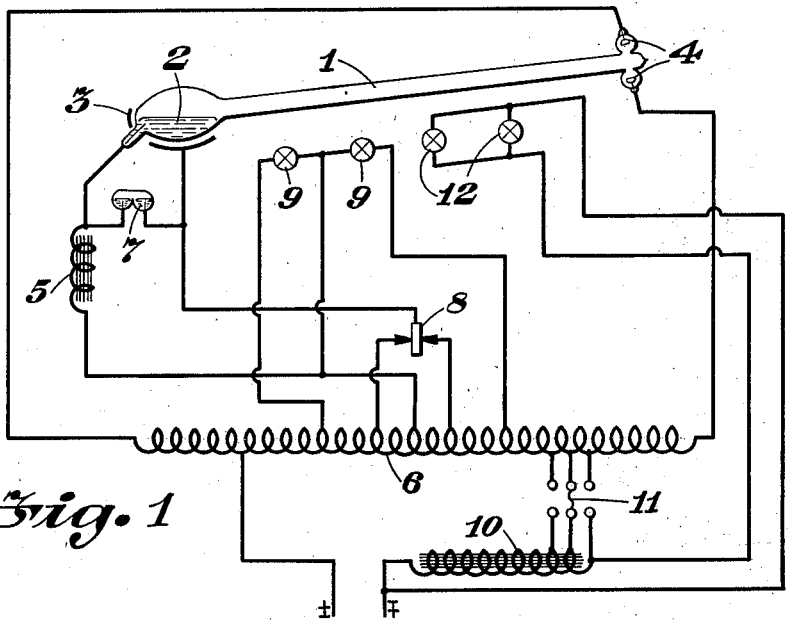

Dec. 21, 1937.   L. J. BUTTOLPH   2,103,059
METHOD OF AND APPARATUS FOR OPERATING ELECTRIC DISCHARGE DEVICES
Filed Jan. 23, 1933   2 Sheets-Sheet 1

INVENTOR
Leroy J. Buttolph
BY
Thos. H. Brown
ATTORNEY

Patented Dec. 21, 1937

2,103,059

UNITED STATES PATENT OFFICE 2,103,059

METHOD OF AND APPARATUS FOR OPERATING ELECTRIC DISCHARGE DEVICES

Leroy J. Buttolph, Grantwood, N. J., assignor to General Electric Vapor Lamp Company, Hoboken, N. J., a corporation of New Jersey Application January 23, 1933, Serial No. 653,144

13 Claims. (Cl. 176—13)

The present invention relates to electric gaseous discharge devices generally, and in particular to combinations thereof with incandescent lamps.

The invention consists in a new and novel combination of elements, and in a new and novel mode of operation thereof, as hereinafter set forth and claimed.

A particular object of the invention is to provide means to operate an electric gaseous discharge device with incandescent lamps as ballast. Another object of my invention is to provide an artificial light source which will at all times closely approximate daylight. Still another object of my invention is to provide a mode of operation by which the incandescent lamps which are used as ballast are protected from severe voltage fluctuations. Still another object of my invention is to provide extremely inexpensive means, devoid of moving parts, to so protect the lamps. A further object of my invention is to provide an extremely efficient light source. Another object of the invention is to provide a device which operates at a high power factor. Still other objects and advantages of the invention will appear from the following detailed specification, or from an inspection of the accompanying drawings.

Electric gaseous discharge devices, such as the well known neon and mercury arcs, have a negative volt-ampere characteristic and also are somewhat unstable, hence the use of a ballast therewith is necessary whenever these devices are operated on the usual constant potential supply systems. The resistance which has ordinarily been used to provide this ballasting action has resulted in a considerable loss of energy which might be profitably used in the production of light by the use of incandescent lamps as ballast. Unfortunately, however, the volt-ampere characteristics of the incandescent lamps and of the discharge device are such that when these lamps are used as ballast virtually all of any voltage variation in the supply line is impressed on the incandescent lamps. Since about a third of the total energy is normally dissipated in the ballast, this means that a 10% increase in line voltage will cause the incandescent lamp to operate at as much as 30% over-voltage. With such an over-voltage the life of the incandescent lamp is tremendously reduced to but a few percent of the normal life thereof at rated voltage. Since commercial supply circuits are subject to voltage variations of this order it is thus obvious that to get a reasonable life from the incandescent lamps they must be operated much below their rated voltage when the line voltage is normal. This, however entails a marked decrease, of the order of 50%, in the efficiency of the incandescent lamp, with a consequent wastage of energy, at normal line voltage. Furthermore, where these incandescent lamps are used to modify the light of a gaseous discharge device, such as the mercury vapor arc, for example, to give a light which closely approximates daylight, the great variation in the light given off by the incandescent lamps as a result of these changes in voltage causes an undesirable variation in the color of the light from the combination unit. I have now discovered that these difficulties can be overcome by placing a saturable reactor in parallel with the incandescent lamps. This reactor is designed to be at or just below the saturation point when normal conditions exist in the circuit, and hence upon increase in line potential this reactor becomes saturated and by-passes most of the increased energy which would otherwise pass through the incandescent lamps, while upon decrease in the line voltage the reactor allows the lamp voltage to change in virtually the same manner as has heretofore been the case. As a result of this action it is now possible to operate the ballast lamps much more efficiently at normal line voltage without subjecting them to more than a desired over-voltage for a 10% increase in line potential. At the same time the ratio of the light from the incandescent lamp to the light from the discharge device is maintained much more constant, so that the combined light now retains the desired color characteristic, despite the usual variations in line voltage.

Where vapor arc devices, such as the well known mercury vapor arc, are being operated in series with incandescent lamps as ballast this novel use of a saturable reactor has an additional advantage. When an arc is first initiated in one of these vapor arc devices the voltage drop therein tends to be low and the current tends to be high. As a result an incandescent lamp which is connected in series therewith is subjected to over-voltage during this period, which lasts until the vapor pressure has reached its equilibrium. Likewise in a device of the rectifying type there is a danger of arcing between the anodes during this starting period, in which case the ballast lamps are likewise subjected to over-voltage. The effects of this over-voltage have been so disastrous to the incandescent lamps that it has been found necessary heretofore to use an ordinary resistance as ballast during this period, the ballast incandescents only being inserted by a relay after the vapor arc has reached, or approaches, equilibrium. I have now discovered that the use of a saturable reactor in parallel with the incandescent lamps not only protects the incandescent lamps from severe changes as a result of line voltage variation, but also from the severe changes due to variation in the arc voltage during starting as well. Hence I am now able to ballast a vapor arc from the beginning with the incandescent lamps, without any undue variation in the voltage impressed thereon. This is due to the fact that once saturation is reached large currents can be drawn through the reactor without materially increasing the voltage drop therethrough.

The use of a saturable reactor in parallel with the incandescent lamps also offers another advantage. Incandescent lamps are commercially available in certain standard sizes, and for economy it is desirable to use these standard lamps. In only rare cases, however, is the current of a gaseous discharge device identical with that of a standard incandescent lamp, hence the use of a standard lamp is frequently impossible. I now find, however, that by providing suitable taps on my saturable reactor the latter may be made to operate also as a series autotransformer, with the result that any standard lamp of the desired wattage may now be used as ballast regardless of the arc current.

In order to preheat the filaments of the ballast lamps, and thus to minimize the initial current rush incandescent lamps of approximately equal wattage are so connected as to draw their energy through the ballast lamps. These lamps draw enough current to heat the filaments of the ballast lamps during the moment before the gaseous discharge is initiated, and at the same time serve the useful purpose of supplying some light from the moment the unit is switched on. These lamps are in parallel with the gaseous discharge device, and hence operate at a voltage which is either the same as, or proportional to, the voltage of said device. During the starting period of a vapor arc this is of advantage, for the reduced current then drawn by these lamps, due to the lower arc voltage, tends to offset the increased arc current, and thus minimizes the current change in the ballast lamps and reactor.

Extreme flexibility is attained with my novel structure, for even destruction of the ballast incandescents will not materially alter the operation of the device, except as to power factor, while so long as any one of the various lighting units remains operative some light will be given.

In the foregoing paragraphs I have referred only to the use of incandescent lamps as ballast. It is to be understood, however, that any other type of device, preferably one giving illumination, can be substituted for these lamps, provided it has a volt-ampere characteristic which is sufficiently positive to stabilize the operation of the gaseous discharge. For example, under certain conditions, sodium arcs are known to have a positive volt-ampere characteristic. Various other discharge devices, such as the tungsten arc, also have a like characteristic under certain conditions. In some of these cases the voltage range through which the device may be thus operated is extremely small, while in others the device is subjected to destruction if the potential is greatly increased. Hence the use of a saturable reactor in parallel with such a device will produce the same desirable results that it produces when placed in parallel with the incandescent lamps. Thus it not only protects these devices from over-voltage conditions which would either destroy them or render them inoperative, but also, as a result of this protection, may permit these devices to be operated at a more favorable and efficient energy level under normal conditions. The use of a saturable reactor is also desirable in some cases where an ordinary resistance or the equivalent is used to ballast the gaseous discharge device, especially where these resistances normally operate at relatively high temperatures. In such a case the saturable reactor will greatly prolong the life of the resistance, and under some circumstances will also give improved operating conditions for the gaseous discharge device. Regardless of what type of device is thus normally used to ballast the discharge, however, my novel use of a saturable reactor in parallel therewith also offers the further advantage that in case the normal ballast is destroyed the discharge device continues to operate with substantially normal characteristics, the reactor alone supplying the necessary stabilizing action at some sacrifice of power factor.

For the purpose of illustrating my invention I have shown a preferred embodiment thereof in the accompanying drawings, in which Fig. 1 is a schematic diagram of a mercury vapor arc lamp which is ballasted with incandescent lamps and a saturable reactor.

Figure 2:
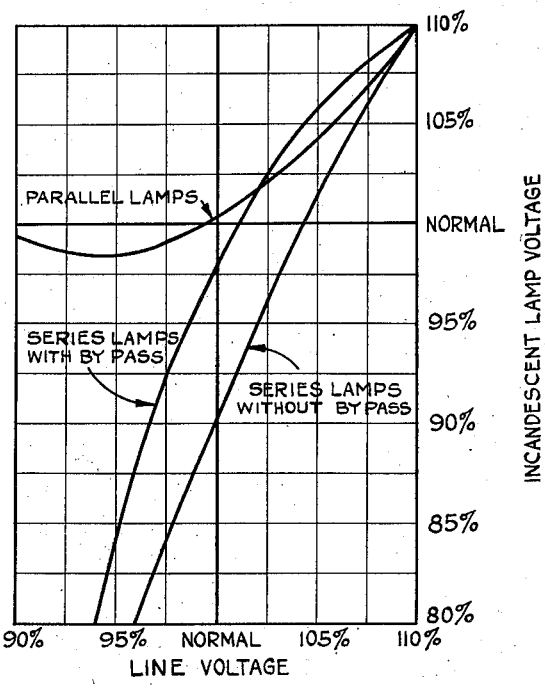
Figure 3:
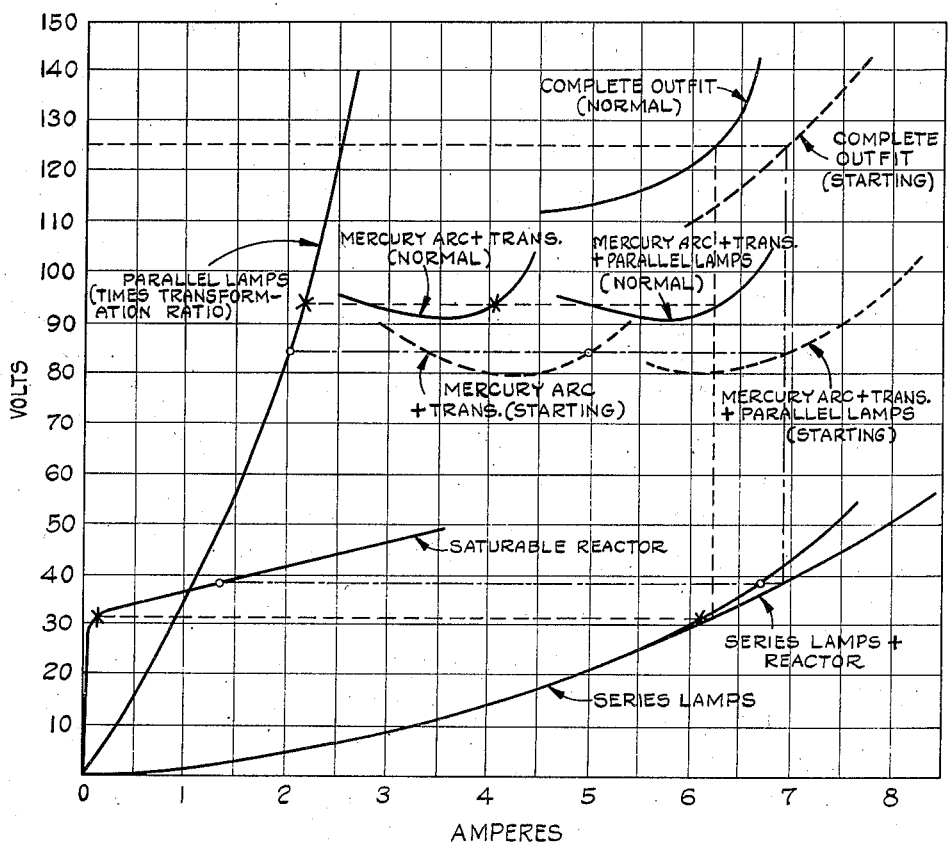

Fig. 2 is a graph showing how the reactor reduces the variation in the lamp voltage with variation in line voltage, and Fig. 3 is a graph showing the current-voltage characteristics of the various components of the unit.

In these drawings, with particular reference to Fig. 1, there is shown a mercury vapor arc lamp 1 of the well known Cooper Hewitt type, having a cathode 2, starting band 3, and anodes 4. Said cathode is connected in a conventional manner through an inductance 5 to the midpoint of an autotransformer 6, while said anodes are each connected directly to the ends of said autotransformer. A connection is made from a point between said cathode and said inductance through a shifter 7 to the negative terminal of a rectifier 8, while the positive terminals of said rectifier are connected to low voltage taps on either side of the midpoint of said autotransformer 6. Said starting band 3 is connected to a point between the shifter 7 and the rectifier 8. A pair of incandescent lamps 9 are each connected on one side to the midpoint of said autotransformer, while the other side of each of said lamps is connected to a tap of suitable voltage on either side of said midpoint. One side of the alternating current supply line is connected directly to said autotransformer 6, while the other side of said line is connected to one end of the saturable reactor 10. The other end of said reactor 10 is tapped, the leads thereto terminating in juxtaposition to a similar series of taps on the autotransformer 6, suitable terminals being provided so that respective pairs of taps can be connected by the fuse 11, or by a connecting link if fuse protection is not desired. The taps on the autotransformer adapt it to operation on lines of slightly different voltages, as for example 105, 115 and 125 volts. With this variation in line voltage the normal current drawn from the line varies inversely, of course, and hence the taps on the reactor 10 are so arranged that the ampere turns therein will be the same regardless of the transformer setting. This novel arrangement of the tap changing fuse is especially desirable, since it enforces the proper change in the reactor whenever a change is made in the transformer taps. This novel tap changing arrangement is also of great value where the arc is ballasted by any other type of impedance. Thus, for example, if a tapped resistance or other impedance is provided the ballasting effect thereof may be maintained at a desired value, regardless of changes in the transformer taps. A pair of incandescent lamps 12 are connected in parallel with the reactor 10. These lamps, like the lamps 9, are preferably arranged in juxtaposition to the mercury arc 1, so that their light will be added to and intermixed with the light from said arc. In practice the wattage is about evenly divided between the mercury vapor arc and the incandescent lamps, since this gives a close approximation of daylight, and at the same time provides exceptionally good operating conditions. Thus where the mercury vapor arc is operated at approximately 400 watts each of the incandescent lamps 9 and 12 is of 100 watt size. While these lamps may be of any voltage rating I prefer to use standard 32 volt lamps, since the efficiency thereof is much higher than that of lamps of higher voltage rating. These lamps are also particularly desirable for the ballast lamps since they are of approximately the right voltage, and thus minimize the transformation necessary in the reactor 10.

In the use and operation of this combination lighting unit as soon as an alternating current of suitable potential is applied thereto current immediately flows from the line through the lamps 12 and the reactor 10, in parallel, thence through the fuse 11 and the autotransformer 6 back to the other side of the line. The lamps 9, being connected to said autotransformer, are thus lighted immediately. Current also flows immediately through a circuit from said autotransformer 6, inductance 5, shifter 7, and rectifier 8, thence back to said autotransformer through one or the other of the taps connected to said rectifier. The current thus flowing through the shifter 7, plus that taken by the incandescent lamps 9, causes a current of considerable value to flow through the series or ballast incandescent lamps 12, with the result that said lamps 12 are partially lighted. At the same time sufficient voltage drop is thus introduced by said ballast to limit the voltage applied to the incandescent lamps 9 to a reasonable value. The current which flows through the inductance 5 during this period causes the shifter 7 to rotate in a well known manner whereby the circuit through said inductance is abruptly interrupted. As the magnetic field thereabout collapses a high voltage surge is generated therein which causes the cathode 2 to be made intensely negative with respect to the starting band 3 and the anodes 4. As a result of the electrical strain thus produced on the cathode a disruptive discharge occurs which provides a "hot spot" and ionizes the mercury vapor, thus permitting the initiation of the normal discharge from the anodes 4. This discharge current flowing through the inductance 5 then maintains the shifter 7 in the open circuit position. At the instant of starting the mercury vapor arc operates with abnormally high current and slightly reduced voltage, due to the low vapor pressure. Also there is a possibility of short circuit arcing between the anodes 4 if there happen to be any drops of mercury condensed thereon. Each of these effects tends to greatly increase the current flow through the ballast lamps 12, but since the reactor 10 is saturated by the normal current, this increase in the current is largely drawn through said reactor with but little increase in the voltage drop therein, so that the voltage change on the lamps 12 is greatly minimized. Since all of these abnormal conditions in the mercury arc are of but short duration, ordinarily considerably less than a minute, these lamps withstand the overload, thus minimized, without any appreciable damage being inflicted thereon, whereas without this reactor they are invariably destroyed by the rush of current during this starting period.

Once these starting variations are over this reactor is still of great value, however. As graphically shown in Fig. 2, which represents observed conditions, this reactor greatly reduces the variations to which the lamps 12 are subjected as a result of the usual variations in line voltage, and thus permits more efficient operation of these lamps at normal line voltage. Thus for a maximum of 10% over-voltage on the lamps at 10% increase in the line voltage above normal the lamps 12 can be operated in my novel circuit at 98% of their rating when the line voltage is normal, whereas without the safeguarding reactor 10 these lamps would have to be operated at approximately 90% of their voltage rating when the line voltage is normal. Thus at normal line voltage the lamps are operated at approximately 30% higher efficiency than they could be if it were not for the protecting reactor 10. Aside from this more efficient usage of the energy, however, my novel arrangement also greatly minimizes the change in the color characteristic of the light from the combined unit with varying line voltage. Thus with my novel circuit the light from the incandescent lamps increases in approximately the same ratio as the light from the mercury arc between normal and 110% line voltage, for example, whereas without the reactor 10 the light from the incandescent lamps 12 increases approximately twice as fast, causing an appreciable change in the color of the light. For subnormal line voltages my novel circuit also gives more favorable operating conditions for all of the incandescent lamps, as this graph clearly shows. The ballast lamps 12 operate, of course, at a much higher voltage and efficiency than would be possible without the use of the reactor, and in addition this novel circuit also provides unusually favorable operating conditions for the so-called parallel lamps 9 which are directly connected to the auto transformer 6. As shown in Fig. 2, these lamps operate at unusually high efficiency just as the efficiency of the lamps 12 begins to rapidly decrease, with the result that the total incandescent light thus remains an approximately constant percentage of the total light at subnormal line potentials as well as at potentials above normal, within the usual range of voltage variation.

Fig. 3 graphically shows the manner in which the saturable reactor 10 cooperates to protect the series lamps 12 from severe changes, either at starting or due to variations in line voltage. This graph shows the current-voltage characteristics of the saturable reactor 10 and of the lamps 12, together with the vectorial sum of these currents, which is at all times equal to the total line current. Likewise there is shown the current-voltage characteristic of the lamps 9 (times the transformer ratio) and of the mercury vapor arc plus the transformer, the latter curve being shown in solid lines to indicate the normal operating condition and in dotted lines to show the starting condition. The lamps 9 and the mercury arc 1 being in parallel their currents have likewise been added, phase relations being ignored in this case, since the phase difference is relatively small. The total voltage-current characteristic of the entire outfit, both normal and at starting is then shown, in solid and dotted curves respectively. Phase relations in the voltages were again ignored in plotting this curve, but the error introduced thereby is extremely small, for the power factor of the unit is approximately 98% under normal operating conditions, so that there is obviously no large out of phase component. The normal operating conditions with a line potential of 125 volts have been indicated on these curves, as well as the starting conditions at the same voltage, normal conditions being indicated by an X and starting conditions by a circle. This shows graphically how well the reactor 10 protects the lamps 12 at the moment of starting, and during the rapid transition to the normal operating condition. It likewise shows how this reactor prevents an undue rise in the potential applied to the series lamps 12 when the line voltage is increased. Likewise many other possible operating conditions may be readily determined from these curves.

As a result of my novel structure I have provided an extremely high degree of flexibility in my novel lighting unit. Thus all four incandescent lamps light up as soon as potential is applied to the unit, and they will continue to operate even though the arc lamp be destroyed. One or both of the lamps 12 could burn out under these conditions, and the remaining lamps will operate in an entirely satisfactory manner. Likewise if the arc is operating any one or even all of the lamps 9 and 12 can burn out without unduly affecting the operation of the arc. In case both of the lamps 12 burn out, for example, the arc is amply ballasted by the reactor 10, although the power factor will obviously be somewhat reduced from the usual 98%.

While I have described my invention by reference to a particular structure it is to be understood that it is not limited thereto, but that various changes, omissions, and substitutions within the scope of the appended claims, may be made therein without departing from the spirit of my invention.

I claim as my invention:—

1. In combination, an electric gaseous discharge device, a reactor which is adapted to be saturated in operation in series therewith, and an incandescent lamp in parallel with said reactor.

2. In combination, an electric vapor discharge device, a reactor which is adapted to be saturated in operation in series therewith, and an incandescent lamp in parallel with said reactor.

3. In combination, an electric gaseous discharge device, a saturable reactor in series therewith, and an incandescent lamp in parallel with said reactor, said reactor being substantially saturated by the current which flows therethrough when the rated potential is applied to said lamp.

4. In combination, an electric gaseous discharge device, a reactor which is adapted to be saturated in operation having a given number of turns connected in series therewith, and an incandescent lamp connected across a different number of turns on said reactor.

5. In combination, an electric gaseous discharge device, a reactor which is adapted to be saturated in operation means to connect a variable number of turns of said reactor in series with said discharge device, through a tapped transformer and an incandescent lamp in parallel with said reactor.

6. In combination, an electric gaseous discharge device, a transformer connected to said device, an impedance in one of the primary leads of said transformer, said transformer and said impedance each having a plurality of taps, each of said taps on said transformer terminating in juxtaposition to a cooperating tap on said impedance, and a connecting link adapted to connect only respective pairs of said taps, whereby any change in the voltage ratio of said transformer is accompanied by a compensating change in said impedance.

7. In combination, an electric gaseous discharge device, a transformer connected to said device, a saturable reactor in one of the primary leads of said transformer, an incandescent lamp in parallel with said reactor, said transformer and said reactor each having a plurality of taps, each of said taps on said transformer terminating in juxtaposition to a cooperating tap on said reactor, and a connecting link adapted to connect only respective pairs of said taps whereby any change in the voltage ratio of said transformer is accompanied by a compensating change in said reactor to impress the same voltage on said lamp.

8. In combination, an electric gaseous discharge device, a reactor which is adapted to be saturated in operation in series therewith, an incandescent lamp in parallel with said reactor, and another incandencent lamp in parallel with said discharge device.

9. The method of operating a device having a positive volt-ampere characteristic in series with a gaseous discharge device which comprises bypassing an increasing portion of the discharge current from said first mentioned device as the voltage thereon tends to rise above normal to maintain said voltage substantially constant.

10. The method of operating an incandescent lamp in series with a gaseous discharge device which comprises bypassing an increasing portion of the current from said lamp as the voltage thereon tends to rise above normal to maintain said voltage substantially constant.

11. A luminous arc discharge tube which radiates light when an electric arc discharge passes through the tube, current carrying means in series with said tube which means generates magnetic flux when a discontinuous current is passed through the said means, at least one incandescent filament in an envelope separate from the envelope of the discharge tube, and means to convert the flux capable of being generated by said current carrying means into current which during operation heats the incandescent filament to incandescence thereby generating a significant proportion of incandescent light which is blended with the light from said discharge tube.

12. A luminous arc discharge tube containing one or more substances selected from the group consisting of a rare gas and mercury which tube radiates light when an electric arc discharge passes through the tube, current carrying means in series with said tube which means generates magnetic flux when discontinuous current is passed through said means, at least one incandescent filament in an envelope separate from the envelope of the discharge tube, and means to convert the flux capable of being generated by said current carrying means into current which during operation heats the incandescent filament to incandescence thereby generating a significant proportion of incandescent light which is blended with the light from said discharge tube.

13. A luminous arc discharge tube which radiates light when an electric arc discharge passes through the tube, current carrying means in series with said tube which means generates magnetic flux when a discontinuous current is passed through the said means, at least one incandescent filament in an envelope separate from the envelope of the discharge tube, and means to convert the flux capable of being generated by said current carrying means into current which during operation heats the incandescent filament to incandescence thereby generating a significant proportion of incandescent light which is blended with the light from said discharge tube, said means to convert the flux having a core which is saturated when the current through said filament is below that which will cause rapid destruction of said filament.

LEROY J. BUTTOLPH.